(12) United States Patent
Shin

(10) Patent No.: US 7,643,276 B2
(45) Date of Patent: *Jan. 5, 2010

(54) DISPLAY APPARATUS

(75) Inventor: Jong-hwa Shin, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 258 days.

This patent is subject to a terminal disclaimer.

(21) Appl. No.: 11/533,833

(22) Filed: Sep. 21, 2006

(65) Prior Publication Data

US 2007/0064380 A1 Mar. 22, 2007

(30) Foreign Application Priority Data

Sep. 22, 2005 (KR) .................. 10-2005-0088162

(51) Int. Cl.
*G06F 1/16* (2006.01)

(52) U.S. Cl. ............... 361/679.06; 361/679.07; 361/679.22; 248/917

(58) Field of Classification Search ........... 361/681, 361/683, 679–686, 724–727, 682, 679.01–679.45, 361/679.55–679.58; 248/917–924; 312/223.1, 312/223.2

See application file for complete search history.

(56) References Cited

U.S. PATENT DOCUMENTS

| | | | | |
|---|---|---|---|---|
| 6,010,111 | A * | 1/2000 | Cho | 248/346.06 |
| 6,601,810 | B2 * | 8/2003 | Lee | 248/278.1 |
| 6,712,321 | B1 * | 3/2004 | Su et al. | 248/123.11 |
| 6,822,857 | B2 * | 11/2004 | Jung et al. | 361/681 |

(Continued)

FOREIGN PATENT DOCUMENTS

CN 1734680 2/2006

(Continued)

OTHER PUBLICATIONS

Jong-hwa Shin; entitled "Display Apparatus"; U.S. Appl. No. 11/533,556, filed Sep. 20, 2006; pp. 1-17; 9 sheets of drawings (Figs. 1-9).

(Continued)

*Primary Examiner*—Jayprakash N Gandhi
*Assistant Examiner*—Nidhi Desai
(74) *Attorney, Agent, or Firm*—Stanzione & Kim, LLP

(57) ABSTRACT

A display apparatus including a display main body that displays an image thereon and a base member, the display apparatus further including a lifting unit which includes a guide frame that stands on the base member and a lifting member coupled with the guide frame to move with the display main body, a pivoting unit which is provided between the display main body and the lifting member and supports the display main body to pivot around a pivot axis in clockwise and counterclockwise directions, and a locking unit which includes a moving member that is lifted together with the display main body and moves with a pivoting operation of the display main body, and a locking projection provided on the guide frame to limit one of the pivoting operation and the lifting operation of the display main body by limiting the moving member from moving. With this configuration, the display apparatus can limit a display main body from moving downward while remaining pivoted, and from pivoting while remaining in a lowered position close to the base member.

40 Claims, 11 Drawing Sheets

U.S. PATENT DOCUMENTS

| | | | |
|---|---|---|---|
| 6,874,743 B2 * | 4/2005 | Watanabe et al. | 248/276.1 |
| 6,966,532 B2 * | 11/2005 | Ishizaki et al. | 248/274.1 |
| 7,061,753 B2 * | 6/2006 | Michoux et al. | 361/681 |
| 7,126,815 B2 * | 10/2006 | Hwang et al. | 361/681 |
| 7,150,440 B2 * | 12/2006 | Yuan | 248/372.1 |
| 2004/0011932 A1 | 1/2004 | Duff | |
| 2004/0113031 A1 * | 6/2004 | Sung | 248/146 |
| 2004/0118984 A1 * | 6/2004 | Kim et al. | 248/149 |
| 2004/0147178 A1 * | 7/2004 | Kim et al. | 439/894 |
| 2007/0008686 A1 * | 1/2007 | Jang | 361/681 |
| 2007/0064379 A1 * | 3/2007 | Shin | 361/681 |
| 2007/0064380 A1 * | 3/2007 | Shin | 361/681 |
| 2007/0195495 A1 * | 8/2007 | Kim et al. | 361/681 |
| 2007/0217134 A1 * | 9/2007 | Shin | 361/681 |

FOREIGN PATENT DOCUMENTS

| | | |
|---|---|---|
| EP | 1403579 | 3/2004 |
| EP | 1536398 | 6/2005 |
| EP | 1626223 | 2/2006 |
| JP | 11-7250 | 1/1999 |
| JP | 11-153960 | 6/1999 |
| JP | 11-153961 | 6/1999 |
| JP | 11-338363 | 12/1999 |
| KR | 2002-68264 | 11/2002 |
| KR | 2004-15643 | 2/2004 |
| KR | 2005-20255 | 3/2005 |

OTHER PUBLICATIONS

Jong-hwa Shin; entitled "Display Apparatus"; U.S. Appl. No. 11/533,480, filed Sep. 20, 2006; pp. 1-20; 9 sheets of drawings (Figs. 1-9).

European Search Report dated Mar. 3, 2008 issued in EP 06120982.1.

CN Office Action issued Apr. 3, 2009 in CN Application No. 2006101540924.

\* cited by examiner

DISPLAY APPARATUS

CROSS-REFERENCE TO RELATED APPLICATIONS

This application claims the benefit of Korean Patent Application No. 2005-0088162, filed on Sep. 22, 2005, in the Korean Intellectual Property Office, the disclosure of which is incorporated herein in its entirety by reference.

BACKGROUND OF THE INVENTION

1. Field of the Invention

The present general inventive concept relates to a display apparatus, and more particularly, to a display apparatus having improved rotating and lifting configurations of a display main body.

2. Description of the Related Art

Generally, a display apparatus comprises a display main body, which displays an image thereon, and a base member which is stably seated on an installing surface, such as a table, desk, wall, etc., to support the display main body.

Recently, display main bodies have been employing a flat display panel, such as a liquid crystal display (LCD) panel or a plasma display panel (PDP).

Korean Patent Application No. 10-2002-0068264 discloses a monitor device as an example of a display apparatus which comprises a flat display panel. The conventional monitor device comprises a monitor main body, a base which supports the monitor main body, a guide rail which stands on a base member, a slider which is coupled with the monitor main body and is coupled with the guide rail to slide, and a spring which is connected with the slider and the guide rail. Thus, the monitor main body can move upward and downward along the guide rail.

The conventional monitor device has recently been manufactured to have a pivot function that allows the monitor main body to pivot around an axis in clockwise and counterclockwise directions thereof, to satisfy various needs of customers.

However, the conventional monitor device does not limit or prevent the monitor main body from moving downward toward the base while remaining in a pivoted position, nor does the conventional monitor device limit the monitor main body from pivoting while remaining in a lowered position.

SUMMARY OF THE INVENTION

The present general inventive concept provides a display apparatus which can limit a display main body from moving downward toward a lowered position near a base while remaining in a pivoted position, and from pivoting while remaining in the lowered position.

The present general inventive concept also provides a display apparatus which rotates a display main body in various directions with respect to a base member.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept are achieved by providing a display apparatus comprising a display main body to display an image thereon and a base member, and further comprising a lifting unit which comprises a guide frame to connectably stand on the base member and a lifting member coupled with the guide frame to move with the display main body, a pivoting unit which is provided between the display main body and the lifting member and supports the display main body to pivot around a pivot axis of clockwise and counterclockwise directions, and a locking unit which comprises a moving member to be lifted together with the display main body and to move with a pivoting operation of the display main body, and a locking projection provided on the guide frame to limit one of the pivoting operation and the lifting operation of the display main body, and limiting the moving member from moving.

The locking projection can limit the moving member from moving downward along the guide frame toward the base member when the display main body remains pivoted.

The display apparatus further comprises: a moving member guide which is provided on the lifting member and to support the moving member to move between the display main body and the guide frame in a direction away from the display main body and toward the guide frame when the display main body pivots.

The locking unit may further comprise a pressure projection which rotates together with the display main body and presses the moving member away from the display main body and toward the guide frame when the display main body rotates.

The pressure projection may comprise a protruding part which is shaped like a circular arc and to press the moving member away from the display main body and toward the guide frame when the display main body pivots, and an inclination part which is provided to gradually move the moving member to an end part of the protruding part.

A roller may be provided on an end part of the moving member to roll in contact with the pressure projection.

The locking unit may comprise an elastic member which continuously pulls the moving member toward the display main body.

The pivoting unit may comprise a pivoting bracket which is coupled with the display main body, and a pivoting shaft which supports the pivoting bracket to pivot with respect to the lifting member.

The pressure projection may be provided on the pivoting bracket.

The lifting unit may further comprise a lifting spring which is provided between the lifting member and the guide frame to bias the lifting member along the guide frame away from the base member.

The display apparatus may further comprise a swivel unit which is provided between the lifting unit and the base member and supports the display main body to swivel around a rotating axis extending through a length of the guide frame and along a lifting direction of the display main body.

The swivel unit may comprise a swivel bracket which is provided on a lower part of the guide frame; a swivel supporter which protrudes from the base member; and a swivel shaft which connects the swivel bracket to swivel with respect to the swivel supporter.

The display apparatus may further comprise a tilting unit which is provided between the lifting unit and the pivoting unit and to support the display main body to tilt around a tilt axis to face in upward and downward directions.

The tilting unit may comprise a tilting bracket which is coupled with the pivoting unit; a tilting supporter which is coupled with the lifting member; and a tilting shaft which tiltably connects the tilting bracket and the tilting supporter.

The locking projection limits the moving member from moving to prevent the pivoting operation of the display main body while the lifting member is at a position of the guide frame close to the base member.

The foregoing and/or other aspects of the present general inventive concept are also achieved by providing a supporting apparatus comprising a base member to support a display main body that displays an image thereon, the supporting apparatus further comprising: a lifting unit which comprises a guide frame to connectably stand on the base member and a lifting member coupled with the guide frame to move with the display main body; a pivoting unit which is provided between the display main body and the lifting member and supports the display main body to pivot around a pivot axis in clockwise and counterclockwise directions; and a locking unit which comprises a moving member to be lifted together with the display main body and to move with a pivoting operation of the display main body, and a locking projection provided on the guide frame to limit one of the pivoting operation and the lifting operation of the display main body, and limiting the moving member from moving.

The supporting apparatus may further comprise: a moving member guide which is provided on the lifting member and to support the moving member to move between the display main body and the guide frame when the display main body pivots.

The supporting apparatus may further comprise a swivel unit which is provided between the lifting unit and the base member and supports the display main body to swivel around a rotating axis in a lifting direction.

The supporting apparatus may further comprises a tilting unit which is provided between the lifting unit and the pivoting unit and supports the display main body to tilt around a tile axis to face in upward and downward directions.

The foregoing and/or other aspects of the present invention are also achieved by providing a display panel support, comprising: a base; an elongated lifting unit connected at one end to the base and including a locking projection therein extending along a predetermined length of the lifting unit; a lifting member movably connected to the lifting unit to move along the length of the lifting unit and including a moving member extending therethrough in a direction perpendicular to the moving direction of the lifting member toward the lifting unit; a tilting bracket tiltably connected to the lifting member; and a circular pivot bracket including: a pivot shaft extending through a center thereof to pivotally connect the pivot bracket to the tilting bracket, and a pressure projection disposed on one side thereof having a semicircular shape to surround a portion of the pivot shaft, the pivot bracket being connectable to a display panel to pivot with the display panel on the pivot shaft with respect to the lifting member such that the pressure projection presses the moving member toward the lifting unit when the display panel is being pivoted, and the interaction between the moving member and the projection prevent movement of at least one of the lifting member and the pivot bracket depending on a position of the lifting member with respect to the guide frame.

The pressure projection may comprise an inclined portion at one end thereof which inclines from the one side of the pivot bracket to a surface of the pressure projection facing toward the tilting bracket such that when the display panel is being pivoted, the moving member moves toward the lifting member by moving up the incline to the pressure projection when the locking projection is not aligned therewith.

The moving member may comprise a rolling member connected at one end thereof to roll up the inclined portion and across the pressure projection when the moving member is not aligned with the locking projection.

The lifting unit may comprise a guide rail on each side thereof, each guide rail including a slider to slide along the respective guide rail and connected to the lifting member to slide the lifting member therewith along the length of the lifting unit.

The display panel and pivoting unit is prevented from tilting and pivoting when the moving member is aligned with the locking projection.

The locking projection is disposed at a lower portion of the lifting unit near the base such that the moving member is aligned with the locking projection when the moving member.

The foregoing and/or other aspects of the present invention are also achieved by providing a stand comprising: a base; a guide frame rotatably connected at one end to the base and extending away from the base, the guide frame including a projection extending along a predetermined length therein; a pivot bracket including an arc shaped pressure projection on a first surface thereof and a pivot shaft extending through a center portion thereof to provide a pivoting movement of the pivot bracket and an object connectable thereto on a second surface thereof; and a lifting member slidably connected at one side thereof to the guide frame to slide along the guide toward and away from the base and connected on another side thereof to the pivot bracket via the pivot shaft to allow the pivot bracket to pivot with respect to the lifting member and move with the lifting member, the lifting member comprising a moving member extending therethrough to the pivot bracket at a first side thereof and extending to the guide frame at a second side thereof, wherein the pressure projection presses the moving member when the pivot bracket is pivoted by a predetermined amount such that the interaction between the moving member and the projection prevent movement of at least one of the lifting member and the pivot bracket depending on a position of the lifting member with respect to the guide frame.

The projection can be at a portion of the guide frame such that the moving member faces the projection when the lifting member and moving member are at a portion of the guide frame close to the base such that the pivot bracket is prevented from pivoting close to the base.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
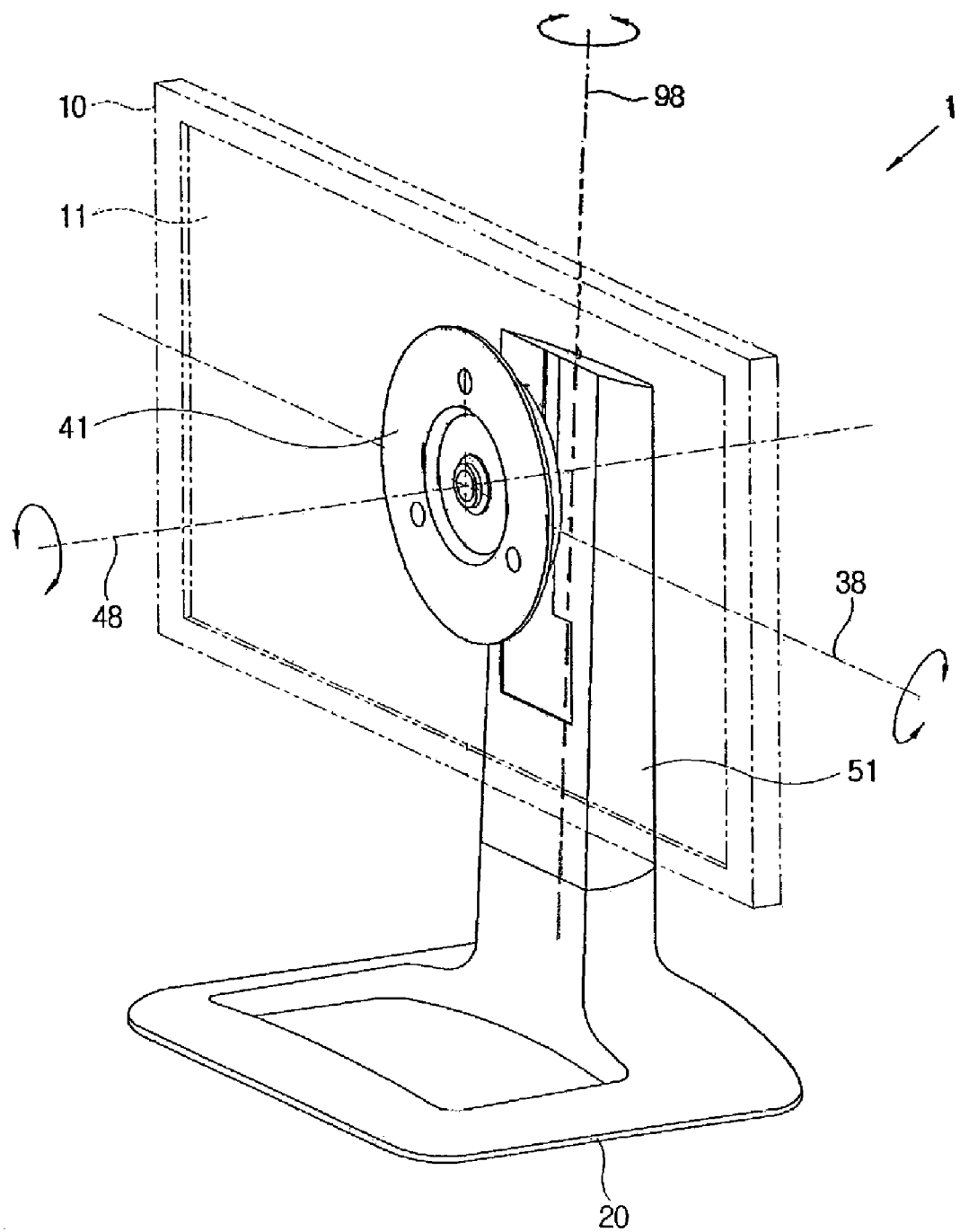
FIG. 1 is a perspective view of a display apparatus according to the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

As illustrated in FIGS. 1 through 11, a display apparatus 1 according to the present general inventive concept comprises a display main body 10 (see FIG. 1) which displays an image thereon, a base member 20 which supports the display main body 10 on an installing surface, a lifting unit 50 (see, for example, FIG. 2) which is provided between the display main body 10 and the base member 20 to move the display main body 10 upward and downward with respect to the base member 20, a pivoting unit 40 which is provided between the display main body 10 and the lifting unit 50 and supports the display main body 10 to pivot around a pivot axis 48 in clockwise and counterclockwise directions, and a locking unit 70 which limits the display main body 10 from moving downward while remaining in a pivoted position by the pivoting unit 40 and from moving downward while remaining in a lowered position by the lifting unit 50.

The display apparatus 1 according to the present general inventive concept may further comprise a swivel unit 90 which is provided between the lifting unit 50 and the base member 20 and supports the display main body 10 to swivel around a rotating axis 98 extending along the length of the lifting unit 50 (in a lifting direction of the display main body 10), and a tilting unit 30 which is provided between the pivoting unit 40 and the lifting unit 50 and supports the display main body 10 to tilt around a rotating axis 38 to face in upward and downward directions.

The display main body 10 comprises a flat display panel 11 (see FIG. 1) such as a liquid crystal display (LCD) or a plasma display panel (PDP) to display an image thereon, and a driving circuit (not illustrated) which drives the display panel 11. A plurality of coupling holes (not illustrated) may be provided on a rear surface of the display main body 10 to be coupled with a pivoting bracket 41 (to be described later) by screws (not illustrated). The coupling holes of the display main body 10 may be formed according to video electronic standard association (VESA) standards.

The base member 20 may be shaped like a plate to be installed on an installing surface such as a table, desk, wall, etc. The base member 20 is coupled to a guide frame 51 of the lifting unit 50 (to be described later) and supports the guide frame 51 to stand in the lifting direction of the display main body 10 with respect to the base 20.

Figure 2:
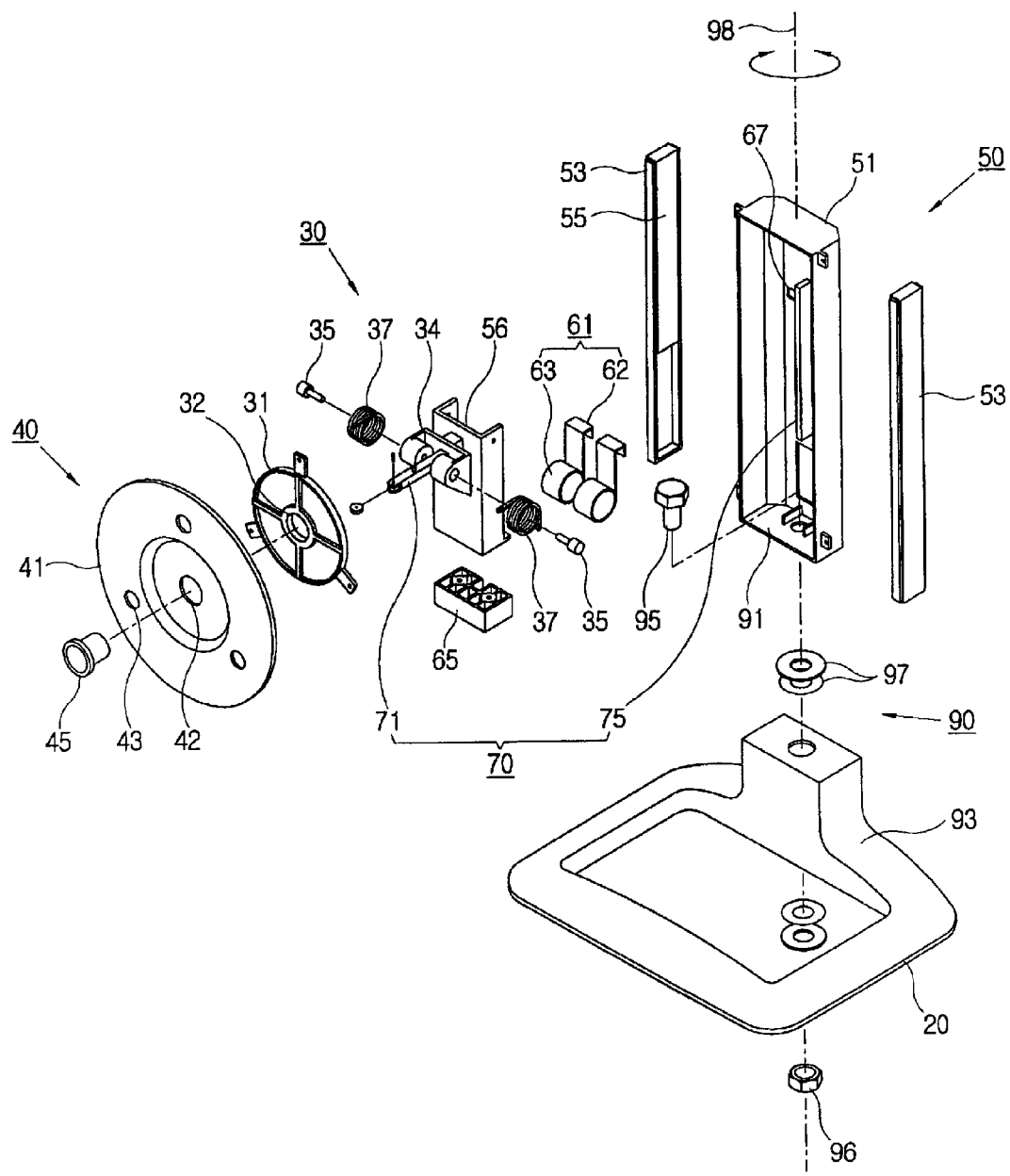
FIG. 2 is an exploded perspective view of the display apparatus according to the present general inventive concept.
Figure 3:
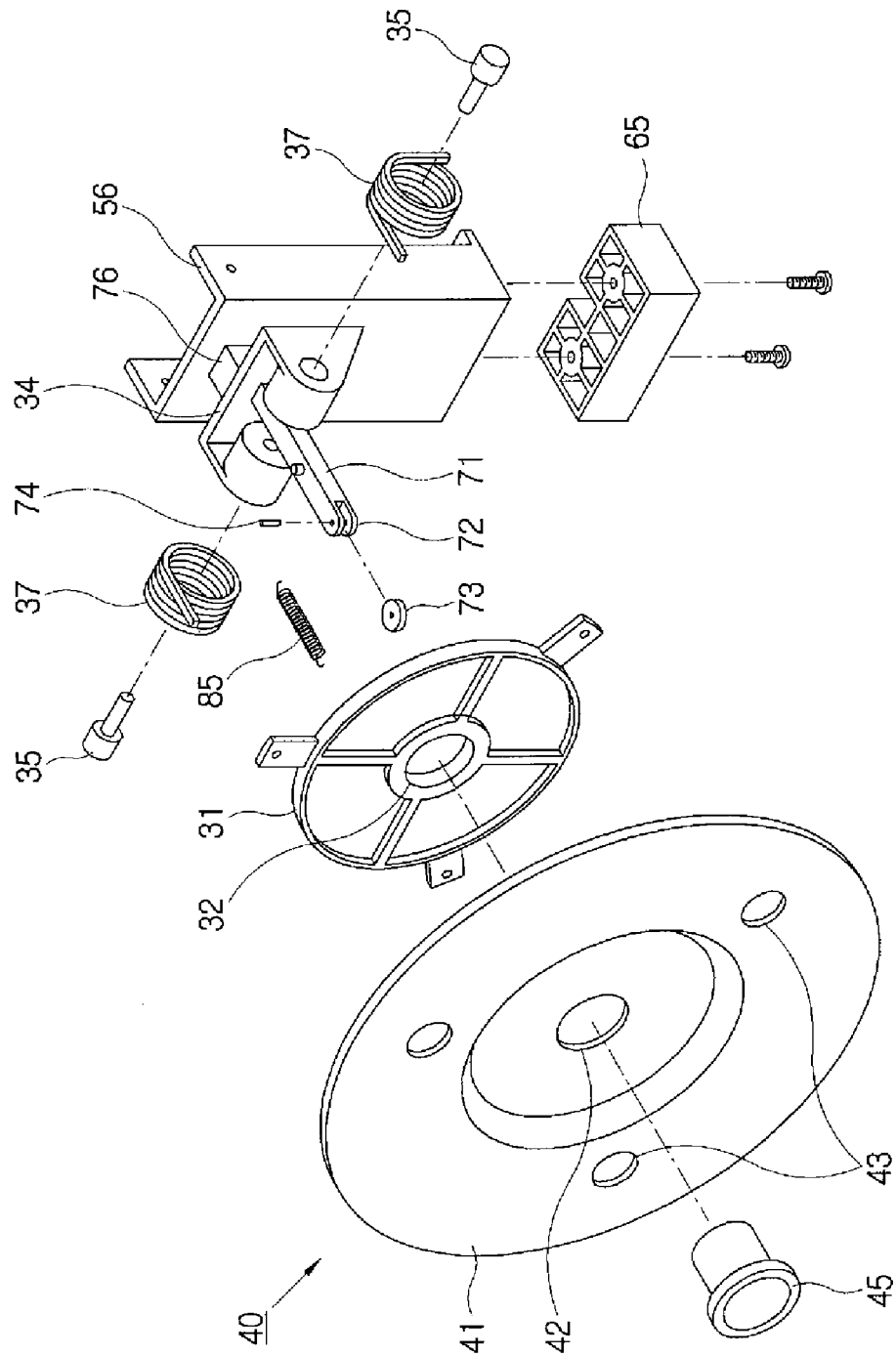
FIG. 3 is an exploded perspective view of a tilting unit, a pivoting unit and a locking unit of the display apparatus according to the present general inventive concept.
Figure 4:
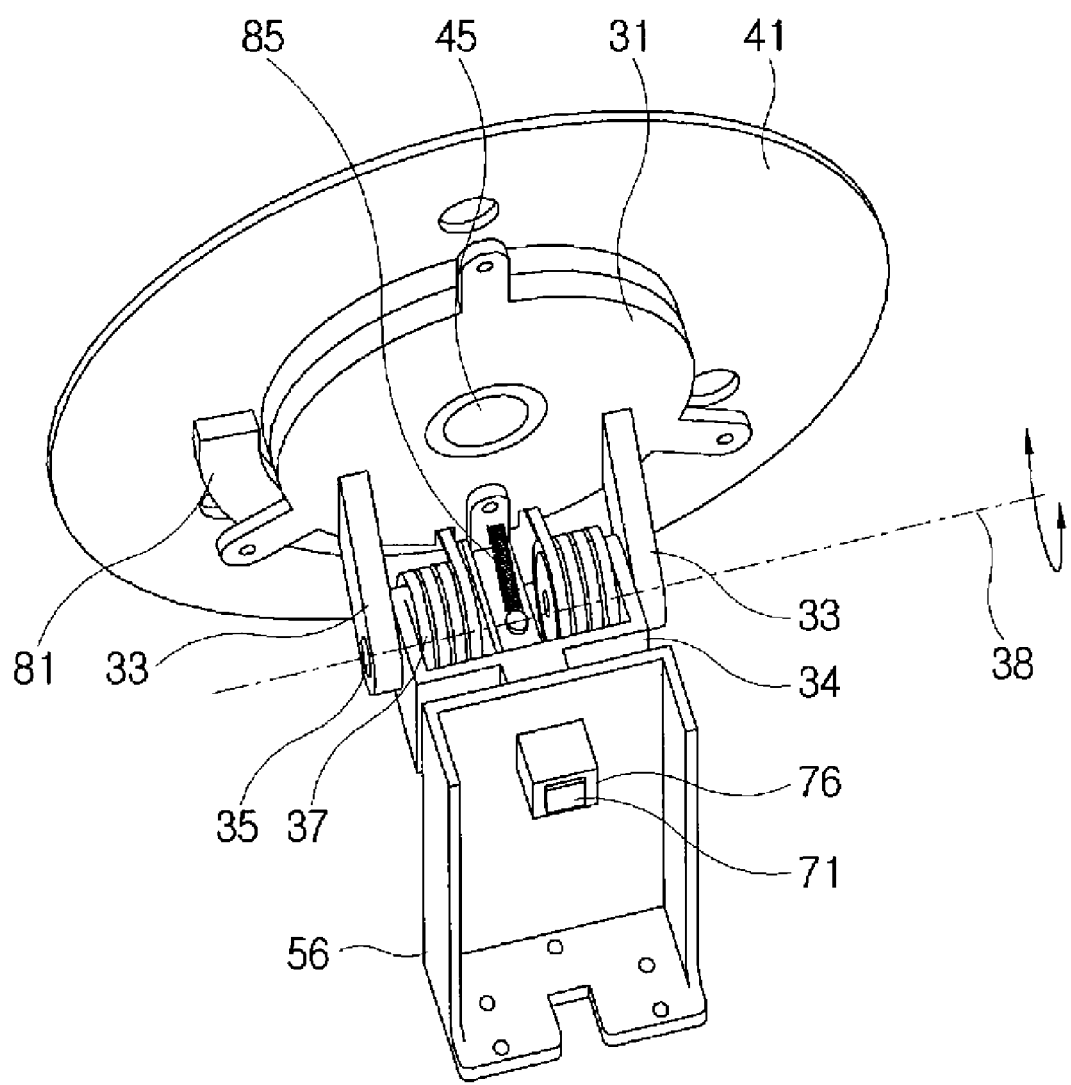
FIG. 4 is a perspective view of the tilting unit, the pivoting unit and the locking unit of the display apparatus when they are coupled with each other, according to the present general inventive concept.

As illustrated in FIGS. 2 through 4, the tilting unit 30 allows the display main body 10 to tilt around a tilt axis 38 to face in the upward and downward directions with respect to the lifting unit 50. The tilting unit 30 may comprise a tilting bracket 31 which is coupled with the pivoting unit 40, a tilting supporting part 34 which is coupled with a lifting member 56 of the lifting unit 50 (to be described later), and a tilting shaft 35 which rotatably connects the tilting bracket 31 and the tilting supporting part 34. The tilting unit 30 may further comprise a tilting spring 37 which is coupled with the tilting bracket 31 and the tilting supporting part 34.

The tilting bracket 31 comprises a pivoting shaft coupling part 32 which is provided on the center of a surface of the tilting bracket 31 to be coupled with a pivoting shaft 45 of the pivoting unit 40 (to be described later), and a tilting shaft coupler 33 which protrudes from the surface of the tilting bracket 31 toward the tilting supporting part 34 to be coupled with the tilting shaft 35.

The tilting supporting part 34 is coupled with the lifting member 56 of the lifting unit 50 (to be described later) to move with the lifting member 56. The tilting supporting part 34 couples with the tilting shaft coupler 33 (see, for example, FIG. 4) of the tilting bracket 31 by the tilting shaft 35 so that the tilting bracket 31 (and the tilting shaft coupler 33) tilts with respect to the tilting shaft 35 with a predetermined friction.

In an exemplary embodiment of the present general inventive concept, the tilting spring 37 comprises a torsion coil spring having a first side coupled with the tilting bracket 31 and a second side coupled with the tilting supporting part 34 to press the tilting bracket 31 to face in an upward direction. The elastic force of the tilting spring 37 prevents the tilting bracket 31 from tilting to face downward due to the weight of the display main body 10.

As illustrated in FIGS. 2 through 6, the pivoting unit 40 is provided between the display main body 10 and the tilting unit 30 to make the display main body 10 pivot around the pivot axis 48 in the clockwise and counterclockwise directions with respect to the base member 20 within predetermined angles. The pivoting unit 40 comprises the pivoting bracket 41 which couples with the display main body 10, and a pivoting shaft 45 which supports the pivoting bracket 41 to pivot with respect to the lifting member 56. The angle ranges of the pivoting unit 40 may be variously set as 90°, 180°, etc. As an example of the present general inventive concept, a pre-pivoting state refers to a state in which the display main body 10 is disposed such that the width is greater than the length thereof (see FIG. 1), and a pivoting state refers to a state in which the display main body 10 is disposed such that the length is greater than the width thereof (see FIG. 9).

A first side of the pivoting shaft 45 is accommodated in and coupled to the pivoting shaft coupling part 32 of the tilting bracket 31 and a second side thereof is coupled with a pivoting shaft accommodator 42 of the pivoting bracket 41, thereby enabling pivoting of the pivoting bracket 41 with respect to the tilting bracket 31. An end part of the pivoting shaft 45 is bent to have a predetermined rotation friction while the pivoting shaft 45 is accommodated in the pivoting shaft coupling part 32 of the tilting bracket 31 and in the pivoting shaft accommodator 42 of the pivoting bracket 41.

The pivoting bracket 41 can be shaped like a plate. The pivoting shaft accommodator 42 is formed on the center of the pivoting bracket 41. The pivoting bracket 41 can comprise a plurality of coupling holes 43 which are coupled with a rear part of the display main body 10 by screws (not illustrated).

The lifting unit 50 comprises the guide frame 51 which stands on the base member 20, and the lifting member 56 which is coupled with the guide frame 51 to move along the length of the guide frame 51 together with the display main body 10. The lifting unit 50 further comprises a pair of guide rails 53 which are coupled with the guide frame 51 in a lengthwise direction, and a slider 55 which is coupled with each guide rail 53 to slide there along, and each slider 55 is coupled to the lifting member 56 by a screw to move with the lifting member 56. The lifting unit 50 further comprises a lifting spring 61 which is coupled with the lifting member 56 and the guide frame 51 to pull the lifting member 56 in an upward direction.

The guide frame 51 has a rectangular box shape to support the pair of guide rails 53 at opposite sides thereof. On a lower part of the guide frame 51 is provided a swivel bracket 91 of the swivel unit 90 (to be described later).

As an exemplary embodiment of the present general inventive concept, the lifting spring 61 can comprise a spiral spring which is wound like a roll, but is not limited thereto. Alternatively, the lifting spring 61 may be provided in various alternative shapes and forms, including a coil spring. A first side 62 of the lifting spring 61 is bent to be coupled with a spring coupler 67 which is provided on an upper part of the guide frame 51, and a second side 63 thereof is wound like a roll to contact a spring supporter 65 which is provided on a lower part of the lifting member 56. Thus, the lifting spring 61 pulls the lifting member 56 in an upward direction with a predetermined elastic force. Such an elastic force of the lifting spring 61 corresponds with the weight of the tilting unit 30, the pivoting unit 40 and the display main body 10 which are coupled with the lifting member 56. The lifting spring 61 is not limited to the spiral spring. Alternatively, the lifting spring 61 may be provided in various other shapes and forms, including a coil spring or a plate spring.

As illustrated in FIGS. 2 through 9, the locking unit 70 comprises a moving member 71 which integrally moves up and down with the display main body 10 and also moves back and forth between the display mail body 10 and the guide frame 51 as a result of the pivoting operation of the display main body 10, and a locking projection 75 which is provided on the guide frame 51 and limits movements of the moving member 71 towards the guide frame 51 to prevent at least one of the pivoting operation or the lifting operation of the display main body 10. The locking unit 70 further comprises a pressure projection 81 (see, for example, FIGS. 4 and 5) which rotates together with the display main body 10 and presses the moving member 71 backward away from the display main body 10 and toward the guide frame 51 when the display main body 10 rotates. The locking unit 70 may further comprise an elastic member 85 which continuously pulls the moving member 71 toward the display main body 10 by being connected at one end thereof to the lifting bracket 31 and at another end thereof to the moving member 71.

The moving member 71 can be shaped like an elongated rectangular bar to move with the pivoting operation of the display main body 10 in forward and backward directions between the display main body 10 and the guide frame 51. The moving member 71 is accommodated in and guided by a moving member guide 76 which is provided on the lifting member 56 and is lifted up and down with the lifting member 56. A roller 73 is provided on the moving member 71 to be in a rolling contact with the pressure projection 81.

The moving member guide 76 penetrates the lifting member 56 and supports the moving member 71 to move in the backward and forward direction when the display main body 10 pivots such that the pressure projection 81 pushes the moving member 71 backward when in contact therewith. As an exemplary embodiment of the present general inventive concept, the moving member guide 76 can have a rectangular shape corresponding to a shape of the moving member 71, but is not limited thereto. Alternatively, the moving member guide 76 may be provided in various shapes including a circular shape, an oval shape, etc.

The roller 73 is rotatably coupled with a roller supporter 72 which is provided on a front end of the moving member 71 adjacent to the display main body 10, by a supporting pin 74, to be in the rolling contact along a projecting surface of the pressure projection 81.

Then, the moving member 71 may move in the backward direction away from the display main body 10 as the roller 73 comes into the rolling contact with the pressure projection 81 while the pressure projection 81 pivots together with the display main body 10.

The elastic member 85 elastically pulls the moving member 71 toward the display main body 10 so that the moving member 71 contacts the pressure projection 81 when the display main body 10 is pivoted. As an exemplary embodiment of the present general inventive concept, the elastic member 85 can be shaped like a coil spring which is coupled with the moving member 71 and the tilting bracket 31 so that the roller 73 of the moving member 71 contacts the pressure projection 81 while the display main body 10 pivots, but is not limited thereto. Alternatively, the elastic member 85 may be provided in various shapes and forms, such as a plate spring or a rubber material. The moving member 71 may be coupled with the pivoting bracket 41 and/or coupled with the lifting member 56 so that the elastic member 85 pulls the moving member 71 toward the display main body 10.

Figure 7:
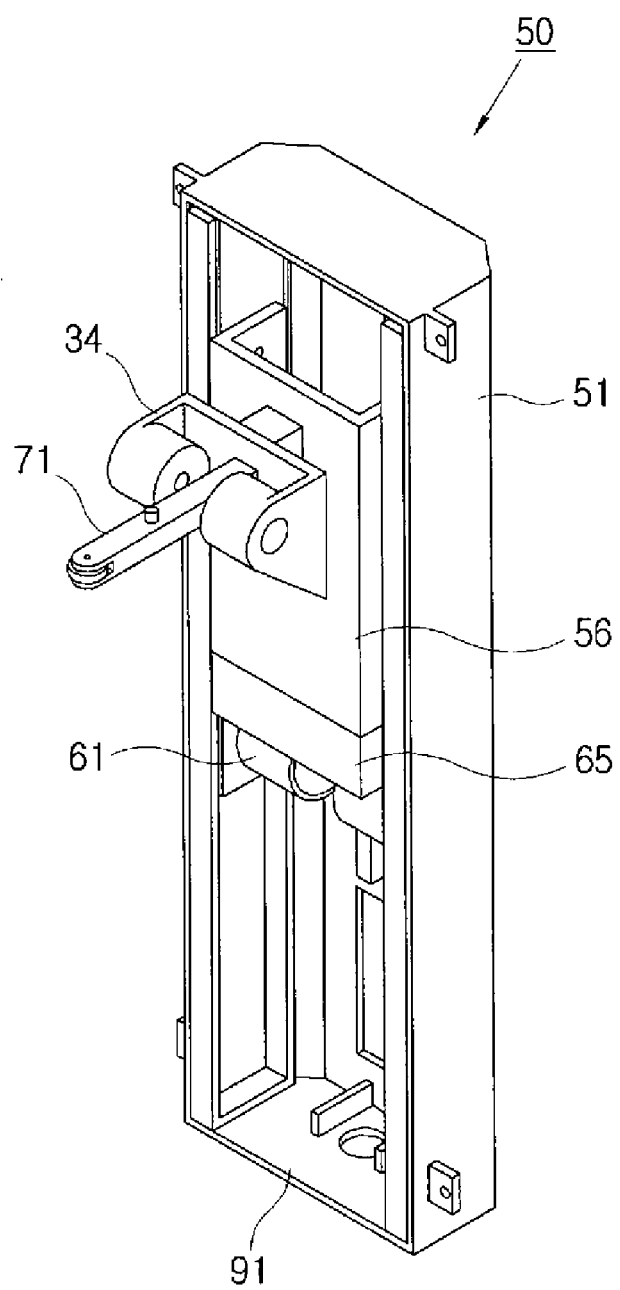
FIG. 7 is a coupling perspective view of a lifting unit of the display apparatus according to the present general inventive concept.
Figure 8:
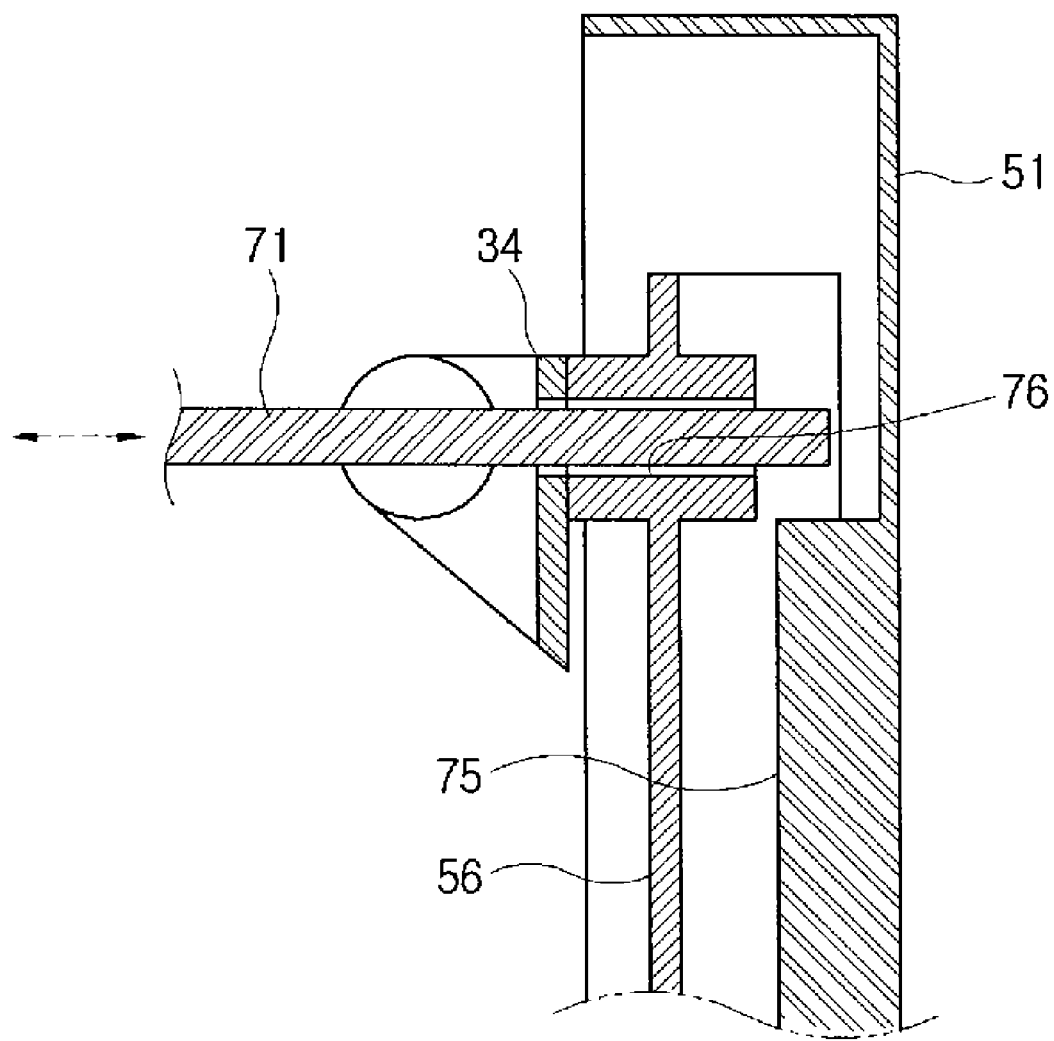
FIGS. 8 and 9 are operational perspective views of the lifting unit and the locking unit of the display apparatus according to the present general inventive concept.

The locking projection 75 can limit the moving member 71 from moving downward while the display main body 10 remains pivoted, thereby preventing the display main body 10 from moving downward while remaining pivoted (see FIGS. 7 and 8). The locking projection 75 can also prevent the moving member 71 from moving backward toward the guide frame 51 while the lifting member 56 moves downward by a predetermined distance along the length direction of the guide frame 51, thereby preventing the display main body 10 from pivoting while remaining lowered (see FIGS. 7 and 9). As an exemplary embodiment of the present general inventive concept, the locking projection 75 protrudes from the guide frame 51 in forward, upward and downward directions (see, for example, FIGS. 2, 8 and 9).

When the display main body 10 is disposed at an upper part of the guide frame 51, the moving member 71 may move backward without interference by the locking projection 75 while the display main body 10 pivots. Also, while in the upper part of the guide frame 51, the moving member 71 is interfered with by an upper part of the locking projection 75 and prevented from moving downward while the display main body 10 remains pivoted (see FIG. 8). The display main body 10 can be made to move downward without contacting the base member 20 or the installing surface by a lower part of the display main body 10 when the display main body 10 is pivoted, i.e., when the longer width of the display main body 10 is disposed in the upward and downward directions. In this case, the upper position of the locking projection 75 can be changed to adjust how far downward the display main body 10 can be positioned before being limited by the locking projection 75 to avoid contacting the base member 20 or the installing surface on which the base member 20 is disposed.

Figure 9:
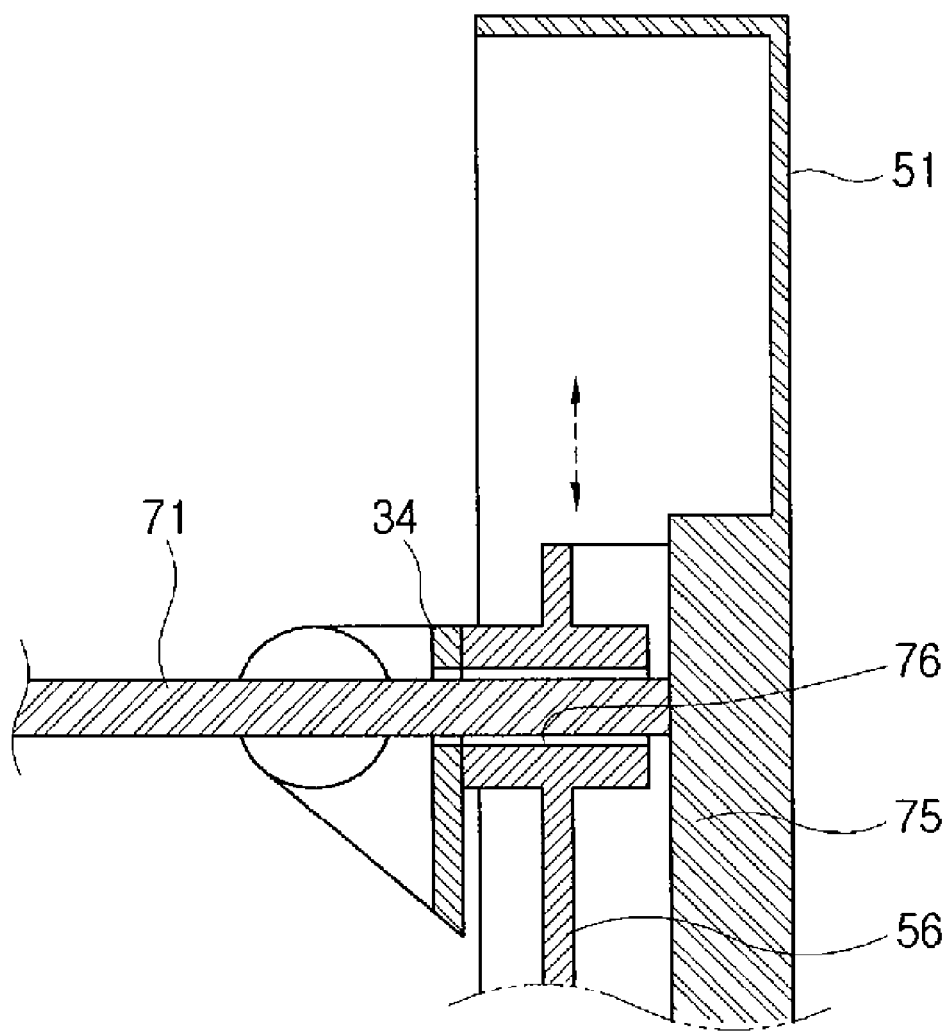

When moving downward by a predetermined distance from the upper part of the guide frame 51 without pivoting, the display main body 10 is prevented from pivoting as a back end of the moving member 71 contacts the front end of the locking projection 75, thus preventing the moving member 71 from moving backward while the display main body 10 is attempting to be pivoted (see FIG. 9). In an exemplary embodiment, even when the display main body 10 remains in a lower position, the moving member 71 may move downward by a predetermined amount while allowing the lower part of the display main body 10 to pivot without contacting the base member 20 or the installing surface by lowering the height in which the locking projection 75 protrudes forward.

Figure 5:
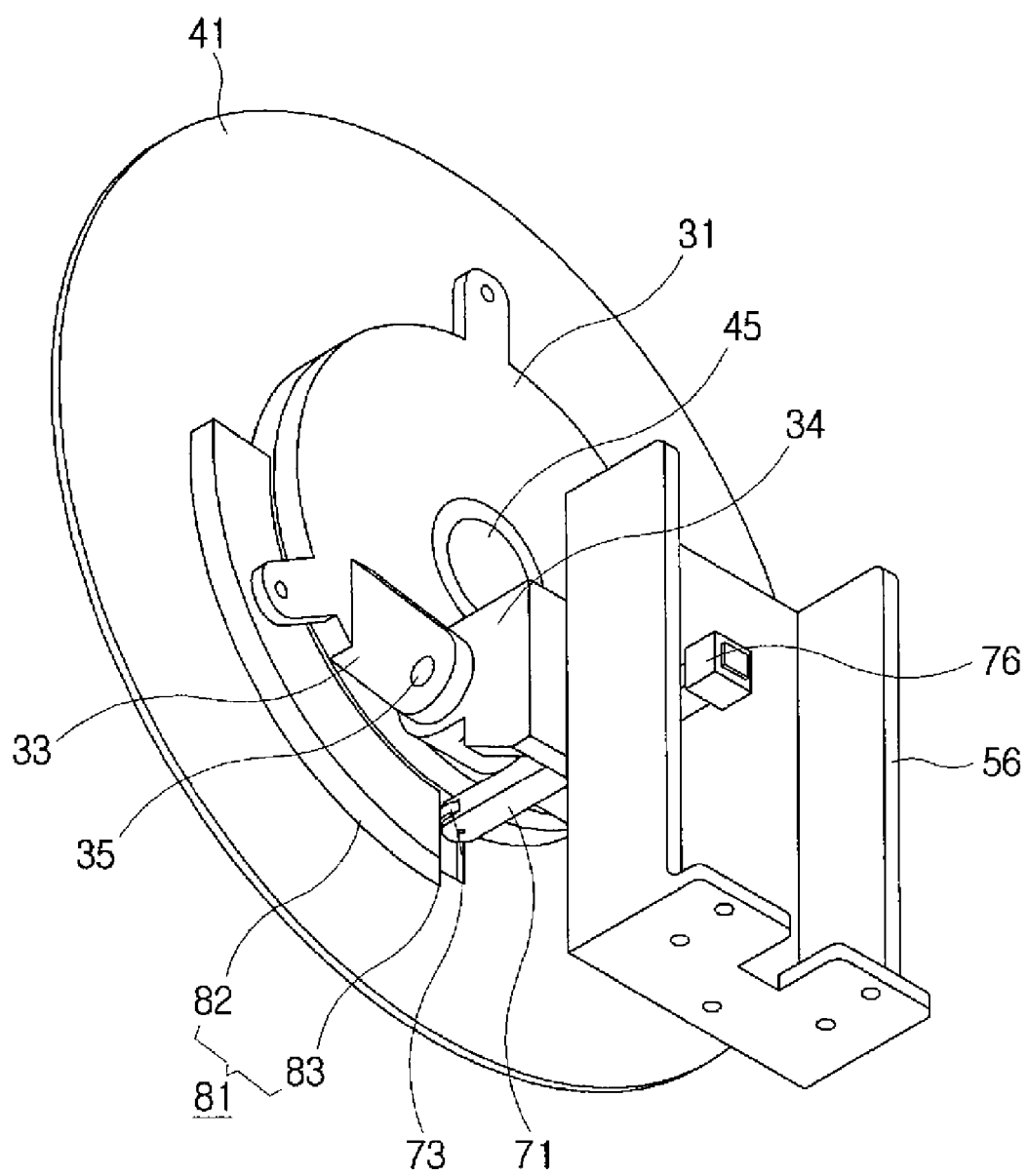
FIGS. 5 and 6 are operational perspective views of the pivoting unit and the locking unit of the display apparatus according to the present general inventive concept.
Figure 6:
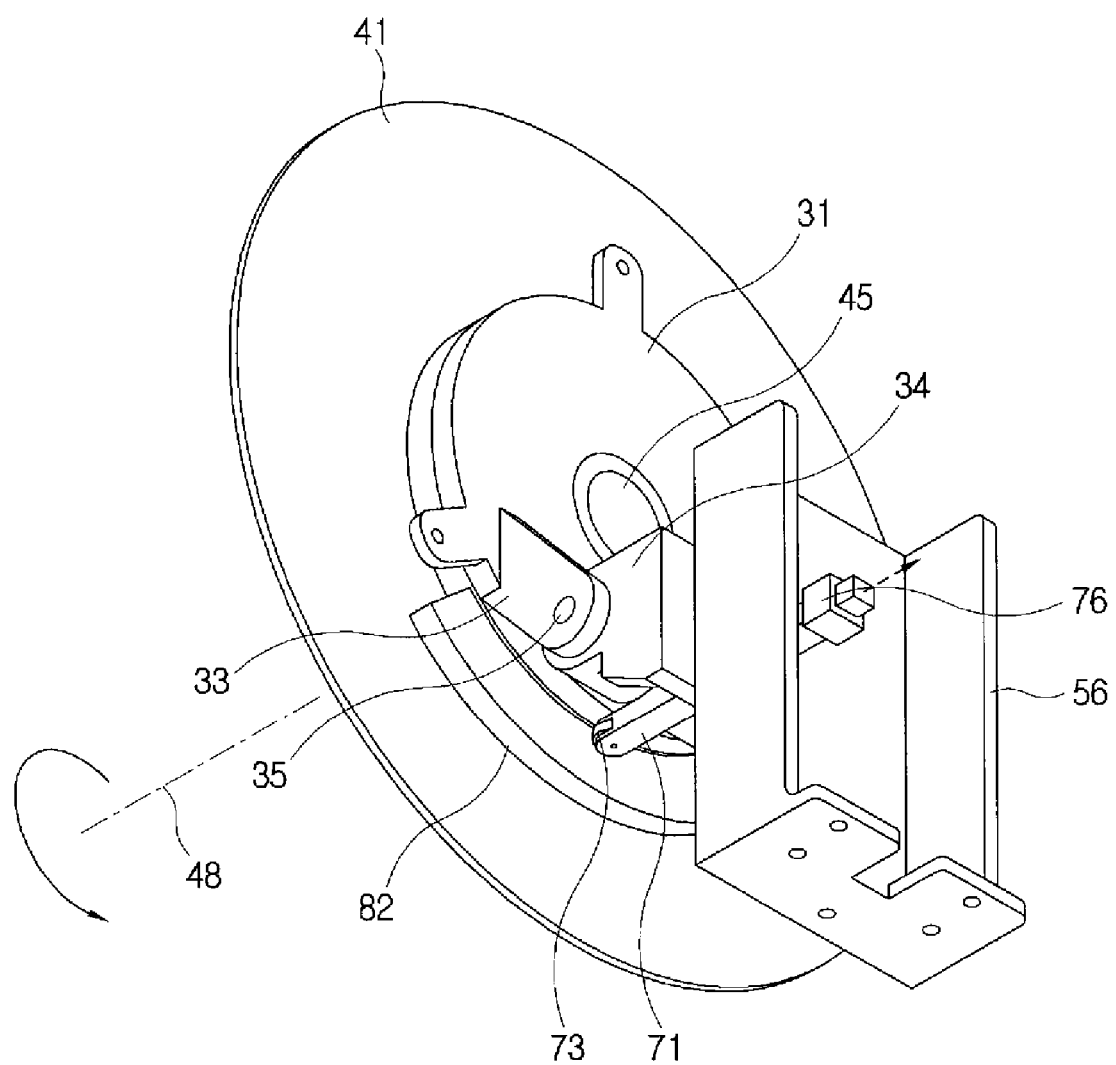

As illustrated in FIGS. 5 and 6, the pressure projection 81 comprises a protruding part 82 which can be shaped like a circular arc to press the moving member 71 when the display main body 10 pivots, and an inclination part 83 which is provided at an inclination to an end part of the protruding part 82 to gradually move the moving member 71 up the inclination and onto the protruding part 82. As an exemplary embodiment of the present general inventive concept, the pressure projection 81 can be provided on the pivoting bracket 41, but is not limited thereto. Alternatively, the pressure projection 81 may be provided on a rear surface of the display main body 10 such that the pivoting bracket 41 is not necessary.

The protruding part 82 protrudes in a backward direction of the pivoting bracket 41 (or the display main body 10) to come into rolling contact with the moving member 71. The protruding part 82 can be shaped like a circular arc and partly surrounds the pivoting shaft accommodator 42 of the pivoting bracket 41. Thus, the protruding part 82 pivots together with the display main body 10 and presses the moving member 71, which is movably coupled with the lifting member 56, to move in the forward and backward directions.

The inclination part 83 is provided on the end part of the protruding part 82 to gradually guide the roller 73 of the moving member 71 up the inclination and toward the protruding part 82. Thus, the moving member 71 becomes in contact with the protruding part 82 with the aid of the inclination part 83 and moves backward when the display main body 10 pivots, due to a pressing force of the pressure projection 81.

As illustrated in FIGS. 5 and 6, when the display main body 10 is disposed at the upper part of the guide frame 51, the pivoting bracket 41 (or the display main body 10) may press the moving member 71 by the pressure projection 81 to move backward while pivoting around the pivoting shaft 45. However, the moving member 71 is prevented from moving backward by the locking projection 75 when the lifting member 56 (and the display main body 10) is lowered to predetermined distances along the length of the guide frame 51, and as a result, the pressure projection 81 and the display main body 10 are prevented from pivoting by the moving member 71.

As illustrated in FIG. 2, the swivel unit 90 allows the display main body 10 to swivel around the rotating axis 98, which extends in the lifting direction of the display main body 10 along the guide frame 51. The swivel unit 90 comprises the swivel bracket 91 which is provided on the lower part of the guide frame 51, a swivel supporter 93 which protrudes from the base member 20, and a swivel shaft 95 which connects the swivel bracket 91 and the swivel supporter 93 to swivel. The swivel unit 90 may further comprise at least one washer 97 which is provided between the swivel bracket 91 and the swivel supporter 93.

As an exemplary embodiment of the present general inventive concept, the swivel shaft 95 is shaped like a bolt to be accommodated within the swivel bracket 91 and the swivel supporter 93 and to be coupled with a coupling nut 96. Thus, the swivel bracket 91 can have a predetermined rotation friction with respect to the swivel supporter 93. A user may swivel the display main body 10 with respect to the base member 20 by overcoming such a predetermined rotation friction.

With this configuration, a process of operating the display apparatus 1 according to the present general inventive concept will be described.

Figure 10:
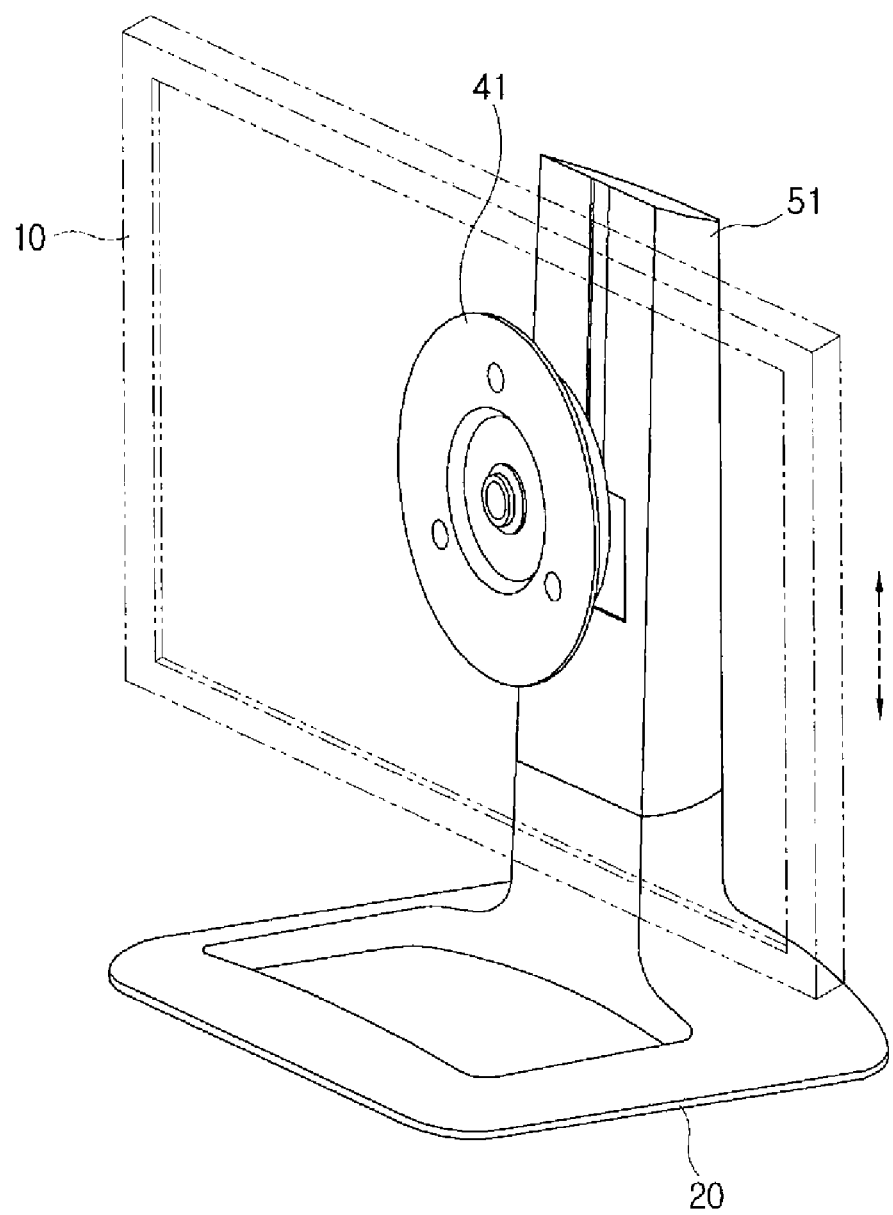
FIGS. 10 and 11 are operational perspective views of the lifting unit and the pivoting unit of the display apparatus according to the present general inventive concept.

As illustrated in FIGS. 1, 2 and 10, the display main body 10 may pivot around the pivoting shaft 45 while being positioned at the upper part of the guide frame 51 of the lifting unit 50. As illustrate in FIGS. 5 through 8, when the display main body 10 pivots, the moving member 71 moves backward while at the position above the upper part of the locking projection 75 by the pressure projection 81 without interference by the locking projection 75. However, when the display main body 10 remains pivoted, movement of the moving member 71 downward is interfered with and prevented by the upper part of the locking projection 75, thereby also preventing the display main body 10 from moving downward.

As the display main body 10 is prevented from moving downward while the longer width of the display main body 10 is disposed in the upward and downward directions, i.e., while the display main body 10 remains pivoted, the lower part of the display main body 10, in its pivoted position, can be prevented from contacting the base member 20 or the installing surface. As a result, the display main body 10 may move downward not to be in contact with the base member 20 or the installing surface by the lower part of the display main body 10 while the long side thereof is disposed in the upward and downward directions, i.e., while remaining pivoted.

Figure 11:
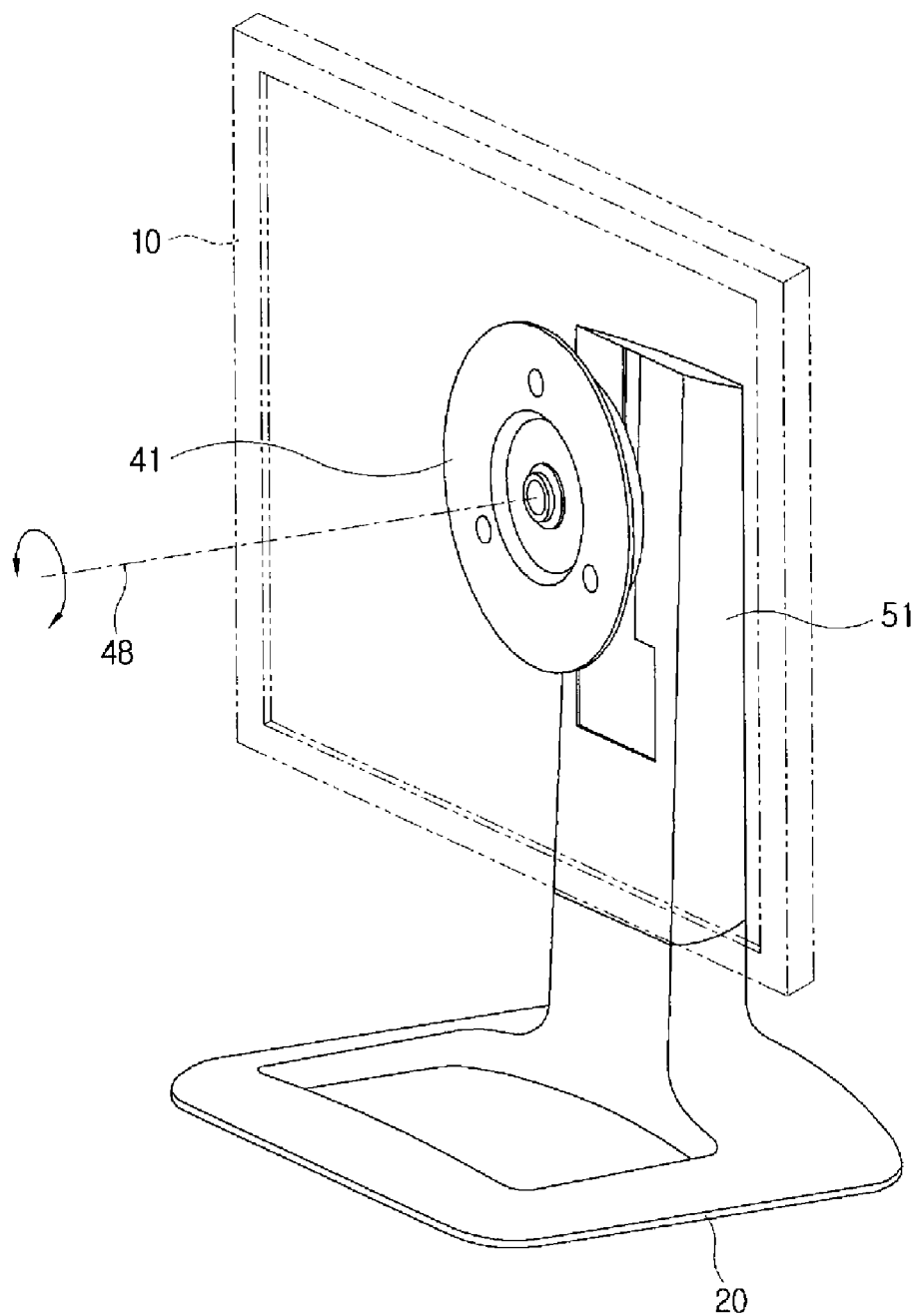

As illustrated in FIGS. 2 and 11, the display main body 10 can not pivot around the pivoting shaft 45 when the display main body 10 remains lowered to the predetermined distances along the guide frame 51 of the lifting unit 50. On the other hand, the moving member 71 may not move backward due to being interfered with by the locking projection 75 when being pushed by the pressure projection 81 while the display main body 10 pivots. As a result, the display main body 10 may not pivot due to the inability of the moving member 71 to move backward (see FIGS. 5 through 7 and 9).

The display apparatus 1 according to the embodiments of the present general inventive concept limits the pivoting operation of the display main body 10 by providing the locking unit 70 when the display main body is in a lower position by predetermined distances with respect to the guide frame 51, thereby preventing the display main body 10 from contacting the base member 20 or the installing surface when the display main body 10 pivots. As stated above, the locking unit 70 can be adjusted to vary the height at which the display main body 10 can be pivoted while being lowered.

The locking unit may limit the pivoting operation of the display main body 10 by providing the moving member 71 moving with the display main body and the locking projection 75 limiting the movement of the moving member 71.

As illustrated in FIG. 1, the display main body 10 of the display apparatus 1 according to the present general inventive concept may tilt around the tilt axis 38 (see FIG. 1) to face in upward and downward directions, and may swivel around the rotating axis 98 in leftward and rightward directions.

Thus, the display apparatus according to the present general inventive concept may pivot, tilt and swivel the display main body with respect to the base member, thereby providing various viewing angles to a user.

As described above, the present general inventive concept provides a display apparatus which limits a display main body from moving downward while remaining pivoted, or limits the display main body from pivoting while in a lower position.

Also, the prevent general inventive concept provides a display apparatus which rotates a display main body in various directions with respect to a base member.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus comprising a display main body to display an image thereon and a base member, further comprising:
   a lifting unit which comprises a guide frame to connectably stand on the base member and a lifting member coupled with the guide frame to move with the display main body;
   a pivoting unit provided between the display main body and the lifting member and to support the display main body to pivot around a pivot axis in clockwise and counterclockwise directions; and
   a locking unit to prevent movement of at least one of the lifting member and the pivoting unit depending on a position of the lifting member with respect to the guide frame; wherein the locking unit comprises a moving member to be lifted together with the display main body and to move with a pivoting operation of the display main body; and a locking projection provided on the guide frame to limit at least one of the pivoting operation and the lifting operation of the display main body by limiting the moving member from moving.

2. The display apparatus according to claim 1, wherein the locking projection limits the moving member from moving along the guide frame toward the base member when the display main body remains pivoted.

3. The display apparatus according to claim 2, further comprising:
   a moving member guide provided on the lifting member and to support the moving member to move between the display main body and the guide frame when the display main body pivots.

4. The display apparatus according to claim 3, wherein the locking unit further comprises:
   a pressure projection which rotates together with the display main body and presses the moving member away from the display main body and toward the guide frame when the display main body rotates.

5. The display apparatus according to claim 4, wherein the pressure projection comprises:
   a protruding part shaped like a circular arc and to press the moving member away from the display main body and toward the guide frame when the display main body pivots; and
   an inclination part which inclines to an end part of the protruding part to gradually move the moving member up the incline to the protruding part.

6. The display apparatus according to claim 5, wherein a roller is provided on an end part of the moving member to roll in contact with the pressure projection.

7. The display apparatus according to claim 3, wherein the locking unit further comprises:
   an elastic member which continuously pulls the moving member toward the display main body.

8. The display apparatus according to claim 4, wherein the pivoting unit comprises:
   a pivoting bracket which is coupled with the display main body; and
   a pivoting shaft which supports the pivoting bracket to pivot with respect to the lifting member, and wherein the pressure projection is provided on the pivoting bracket.

9. The display apparatus according to claim 1, wherein the lifting unit further comprises a lifting spring provided between the lifting member and the guide frame to bias the lifting member along the guide frame away from the base member.

10. The display apparatus according to claim 1, further comprising:
    a swivel unit provided between the lifting unit and the base member and supports the display main body to swivel around a rotating axis extending through a length of the guide frame.

11. The display apparatus according to claim 10, wherein the swivel unit comprises:
    a swivel bracket provided on a lower part of the guide frame;
    a swivel supporter which protrudes from the base member; and
    a swivel shaft which connects the swivel bracket to swivel with respect to the swivel supporter.

12. The display apparatus according to claim 1, further comprising:
    a tilting unit provided between the lifting unit and the pivoting unit and to support the display main body to tilt around a tilt axis to face in upward and downward directions.

13. The display apparatus according to claim 12, wherein the tilting unit comprises:
    a tilting bracket coupled with the pivoting unit;
    a tilting supporter coupled with the lifting member; and
    a tilting shaft which tiltably connects the tilting bracket to the tilting supporter.

14. The display apparatus according to claim 1, wherein the locking projection limits the moving member from moving to prevent the pivoting operation of the display main body while the lifting member is at a position of the guide frame close to the base member.

15. The display apparatus according to claim 11, wherein the locking projection limits the moving member from moving to prevent the pivoting operation of the display main body while the lifting member is at a position of the guide frame close to the base member.

16. The display apparatus according to claim 13, wherein the locking projection limits the moving member from moving to prevent the pivoting operation of the display main body while the lifting member is at a position of the guide frame close to the base member.

17. A supporting apparatus comprising a base member to support a display main body that displays an image thereon, the supporting apparatus further comprising:
    a lifting unit which comprises a guide frame to connectably stand on the base member and a lifting member coupled with the guide frame to move with the display main body;
    a pivoting unit provided between the display main body and the lifting member and supports the display main body to pivot around a pivot axis in clockwise and backward counterclockwise; and
    a locking unit which comprises a moving member to lift together with the display main body and to move with a pivoting operation of the display main body, and a locking projection provided on the guide frame to limit one of the pivoting operation and the lifting operation of the display main body, and limiting the moving member from moving.

18. The supporting apparatus according to claim 17, wherein the locking projection limits the moving member from moving along the guide frame toward the base member when the display main body remains pivoted.

19. The supporting apparatus according to claim 18, further comprising:
a moving member guide provided on the lifting member and to support the moving member to move between the display main body and the guide frame when the display main body pivots.

20. The supporting apparatus according to claim 19, wherein the locking unit further comprises a pressure projection which rotates together with the display main body and presses the moving member away from the display main body and toward the guide frame when the display main body rotates.

21. The supporting apparatus according to claim 20, wherein the pressure projection comprises a protruding part having a shape of a circular arc and to press the moving member when the display main body pivots, and an inclination part which is inclined toward an end part of the protruding part to gradually move the moving member up the incline and toward the pressure projection.

22. The supporting apparatus according to claim 21, wherein a roller is provided on an end part of the moving member to roll in contact with the pressure projection.

23. The supporting apparatus according to claim 19, wherein the locking unit comprises an elastic member which continuously pulls the moving member toward the display main body.

24. The supporting apparatus according to claim 20, wherein the pivoting unit comprises:
a pivoting bracket coupled with the display main body; and
a pivoting shaft which supports the pivoting bracket to pivot with respect to the lifting member, and wherein
the pressure projection is provided on the pivoting bracket.

25. The supporting apparatus according to claim 17, wherein the lifting unit further comprises a lifting spring which is provided between the lifting member and the guide frame to pull the lifting member along the guide frame away from the base member.

26. The supporting apparatus according to claim 17, further comprising:
a swivel unit provided between the lifting unit and the base member and to support the display main body to swivel around a rotating axis extending through the guide frame.

27. The supporting apparatus according to claim 26, wherein the swivel unit comprises:
a swivel bracket provided on a lower part of the guide frame closest to the base member;
a swivel supporter which protrudes from the base member; and
a swivel shaft which connects the swivel bracket to swivel with respect to the swivel supporter.

28. The supporting apparatus according to claim 17, further comprising:
a tilting unit provided between the lifting member and the pivoting unit and supports the display main body to tilt around a tilt axis to faced in upward and downward directions.

29. The supporting apparatus according to claim 28, wherein the tilting unit comprises:
a tilting bracket coupled with the pivoting unit;
a tilting supporter coupled with the lifting member; and
a tilting shaft which tiltably connects the tilting bracket and the tilting supporter.

30. The supporting apparatus according to claim 17, wherein the locking projection limits the moving member from moving to prevent the pivoting operation of the display main body while the lifting member remains in a lowered by the guide frame close to the base member.

31. The supporting apparatus according to claim 27, wherein the locking projection limits the moving member from moving to prevent the pivoting operation of the display main body while the lifting member remains in a lowered by the guide frame close to the base member.

32. The supporting apparatus according to claim 29, wherein the locking projection limits the moving member from moving to prevent the pivoting operation of the display main body while the lifting member remains in a lowered by the guide frame close to the base member.

33. A display panel support, comprising:
a base;
an elongated lifting unit connected at one end to the base and including a locking projection therein extending along a predetermined length of the lifting unit;
a lifting member movably connected to the lifting unit to move along the length of the lifting unit and including a moving member extending therethrough in a direction perpendicular to the moving direction of the lifting member toward the lifting unit;
a tilting bracket tiltably connected to the lifting member; and
a circular pivot bracket including:
a pivot shaft extending through a center thereof to pivotally connect the pivot bracket to the tilting bracket, and
a pressure projection disposed on one side thereof having a semicircular shape to surround a portion of the pivot shaft,
the pivot bracket being connectable to a display panel to pivot with the display panel on the pivot shaft with respect to the lifting member such that the pressure projection presses the moving member toward the lifting unit when the display panel is being pivoted such that the interaction between the moving member and the locking projection prevent movement of at least one of the lifting member and the pivot bracket depending on a position of the lifting member with respect to the lifting unit.

34. The display panel support according to claim 33, wherein the pressure projection comprises an inclined portion at one end thereof which inclines from the one side of the pivot bracket to a surface of the pressure projection facing toward the tilting bracket such that when the display panel is being pivoted, the moving member moves toward the lifting member by moving up the incline to the pressure projection when the locking projection is not aligned therewith.

35. The display panel support according to claim 34, wherein the moving member comprises a rolling member connected at one end thereof to roll up the inclined portion and across the pressure projection when the moving member is not aligned with the locking projection.

36. The display panel support according to claim 33, wherein the lifting unit comprises a guide rail on each side thereof, each guide rail including a slider to slide along the respective guide rail and connected to the lifting member to slide the lifting member therewith along the length of the lifting unit.

37. The display panel support according to claim 34, wherein the display panel and pivoting unit is prevented from tilting and pivoting when the moving member is aligned with the locking projection.

38. The display panel support according to claim 36, wherein the locking projection is disposed at a lower portion of the lifting unit near the base such that the moving member is aligned with the locking projection.

39. A stand comprising:

a base;

a guide frame rotatably connected at one end to the base and extending away from the base, the guide frame including a projection extending along a predetermined length therein;

a pivot bracket including an arc shaped pressure projection on a first surface thereof and a pivot shaft extending through a center portion thereof to provide a pivoting movement of the pivot bracket and an object connectable thereto on a second surface thereof; and a lifting member slidably connected at one side thereof to the guide frame to slide along the guide frame toward and away from the base and connected on another side thereof to the pivot bracket via the pivot shaft to allow the pivot bracket to pivot with respect to the lifting member and move with the lifting member, the lifting member comprising a moving member extending therethrough to the pivot bracket at a first side thereof and extending to the guide frame at a second side thereof, wherein the pressure projection presses the moving member when the pivot bracket is pivoted by a predetermined amount such that the interaction between the moving member and the projection prevent movement of at least one of the lifting member and the pivot bracket depending on a position of the lifting member with respect to the guide frame.

40. The stand according to claim 39, wherein the projection is at a portion of the guide frame such that the moving member faces the projection when the lifting member and moving member are at a portion of the guide frame close to the base such that the pivot bracket is prevented from pivoting close to the base.

* * * * *

UNITED STATES PATENT AND TRADEMARK OFFICE
CERTIFICATE OF CORRECTION

PATENT NO.        : 7,643,276 B2                                      Page 1 of 1
APPLICATION NO. : 11/533833
DATED             : January 5, 2010
INVENTOR(S)       : Jong-hwa Shin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 364 days.

Signed and Sealed this

Sixteenth Day of November, 2010

David J. Kappos
*Director of the United States Patent and Trademark Office*